United States Patent [19]
Breeden et al.

[11] Patent Number: 5,066,949
[45] Date of Patent: Nov. 19, 1991

[54] SENDING DIFFERENT IDENTIFIERS TO SELECTED RECEIVERS, TO REPRESENT THE SAME SOURCE

[75] Inventors: Robert L. Breeden; Richard E. Johnson, both of Boynton Beach; Amy R. Kabcenell, Highland Beach; Thomas F. Holmes, Boynton Beach, all of Fla.

[73] Assignee: Motorola, Inc., Schaumburg, Ill.

[21] Appl. No.: 433,242

[22] Filed: Nov. 8, 1989

[51] Int. Cl.$^5$ .................. G08B 5/22; H04Q 1/30; H04M 11/00
[52] U.S. Cl. .................. 340/825.44; 340/825.47; 340/311.1; 379/57
[58] Field of Search .................. 340/825.44, 825.47, 340/311.1; 379/56, 57, 60, 63

[56] References Cited

U.S. PATENT DOCUMENTS

| | | | |
|---|---|---|---|
| 4,330,780 | 5/1982 | Masaki | 340/825.44 |
| 4,336,524 | 6/1982 | Levine | 340/825.44 |
| 4,382,256 | 5/1983 | Nagata | 340/825.44 |
| 4,536,739 | 8/1985 | Nobuta | 340/825.44 |
| 4,713,808 | 12/1987 | Gaskill et al . | |

*Primary Examiner*—Donald J. Yusko
*Assistant Examiner*—Brian Zimmerman
*Attorney, Agent, or Firm*—William E. Koch; Vincent B. Ingrassia; Anthony J. Sarli, Jr.

[57] ABSTRACT

A method for generating alphanumeric messages in a telephone-entry selective call system comprises programmable selective call source identification for selected selective call receivers and numerically coded canned alphanumeric messages.

2 Claims, 5 Drawing Sheets

SENDING DIFFERENT IDENTIFIERS TO SELECTED RECEIVERS, TO REPRESENT THE SAME SOURCE

FIELD OF THE INVENTION

This invention relates generally to selective call receiver (e.g., paging) communication systems, and more specifically to a paging system providing message source identification and message information.

BACKGROUND OF THE INVENTION

A typical modern-day selective call receiver communication system comprises a terminal and a transmitter which are connected to the telephone lines to allow persons to initiate selective calls from telephones. The typical system also comprises a plurality of selective call receivers such as pagers that are the destination of the selective calls. Many pagers that are in use in such systems today can receive and display alphanumeric messages.

A shortcoming exists in the current art in this area, however, because telephones do not typically support the entry of alpha messages and, therefore, only a portion of an alphanumeric pager's capabilities are realized in such a system.

Thus, what is needed is an improved method for generating alphanumeric paging messages in a telephone-entry paging system.

SUMMARY OF THE INVENTION

Accordingly, it is an object of the present invention to provide an improved method and apparatus for generating alphanumeric paging messages in a telephone-entry paging system.

In carrying out the above and other objects of the invention in one form, there is provided a method for generating a selective call message, comprising the steps of: receiving a signal comprising a source identifier, to provide a received signal; comparing the source identifier with stored source identifiers to determine information associated with the source identifier; and transmitting a message comprising at least the associated information.

DETAILED DESCRIPTION OF THE INVENTION

Figure 1:
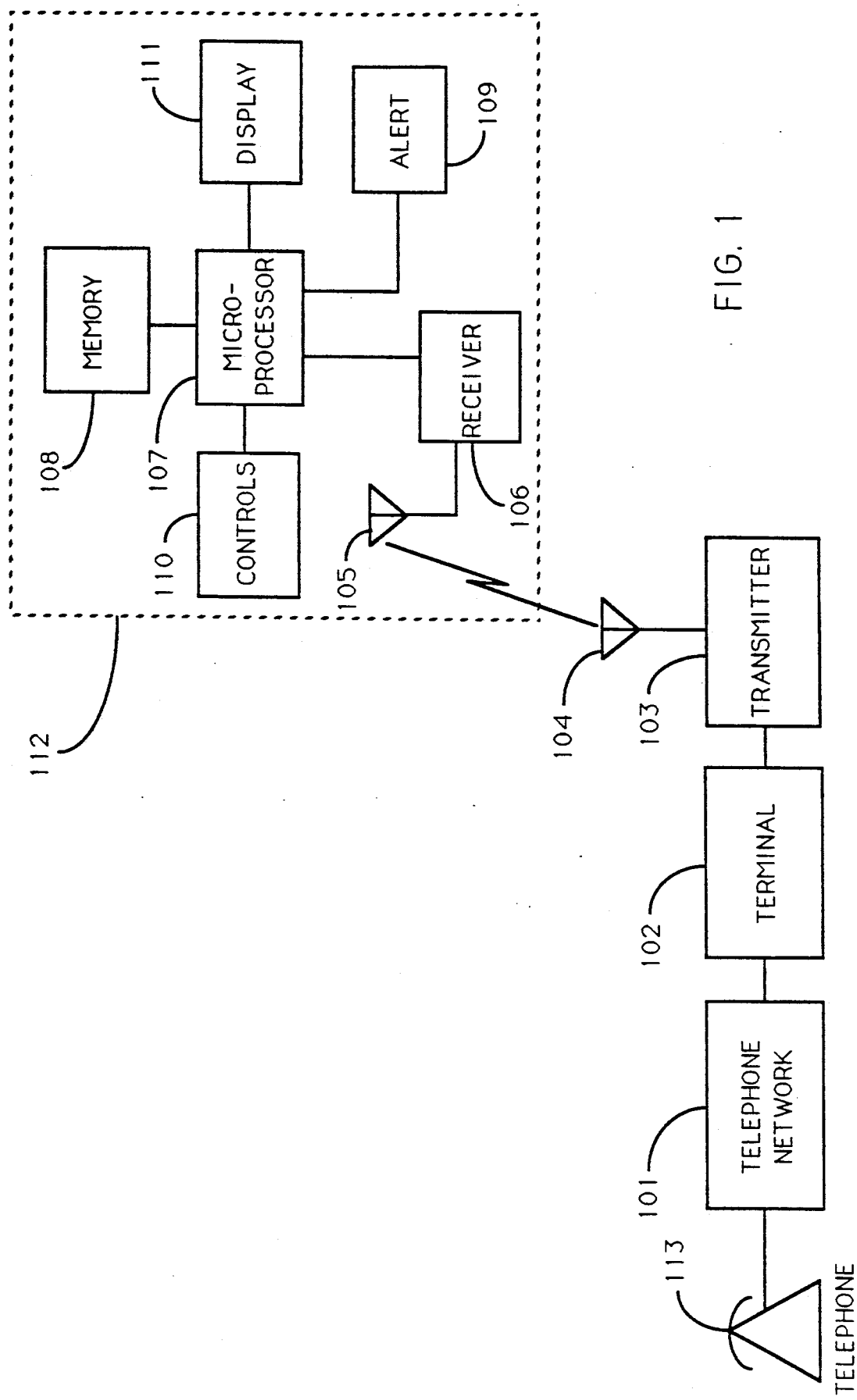
FIG. 1 a block diagram of a paging system in accordance with the present invention.

Referring to FIG. 1, a block diagram of the paging system of the present invention comprising a telephone 113 from which a person may address a particular selective call receiver (SCR) by entering an assigned telephone number or numeric code. Usually, the entry of the telephone number or code is followed by entry of a numeric message for receipt and display by the addressed SCR. The entered numeric data is then relayed through the telephone network 101 to the terminal 102, where the incoming selective calls are processed as described in the following description of FIG. 2. From the terminal 102, the calls are input to a transmitter 103 where they are typically applied as modulation to a radio frequency signal. The resultant modulated radio frequency selective call signal is sent over the air through the antenna 104.

The selective call receiver (SCR) 112 comprises an antenna 105 for receiving the selective call signals over the air. The selective call signal is then input to the receiver 106 where the selective call modulation is recovered and input to the microprocessor 107. The microprocessor 107 compares the selective call address portion of the recovered selective call signal to one or more selective call addresses stored in the memory 108. If there is a match between the received address and any of those stored in the memory 108, the message portion of the selective call is stored in the memory 108 and the alert 109 is activated to inform the user of the SCR 112 that he has received a selective call. By actuation of the controls 110, the user may then display the received message on the display 111.

Figure 2:
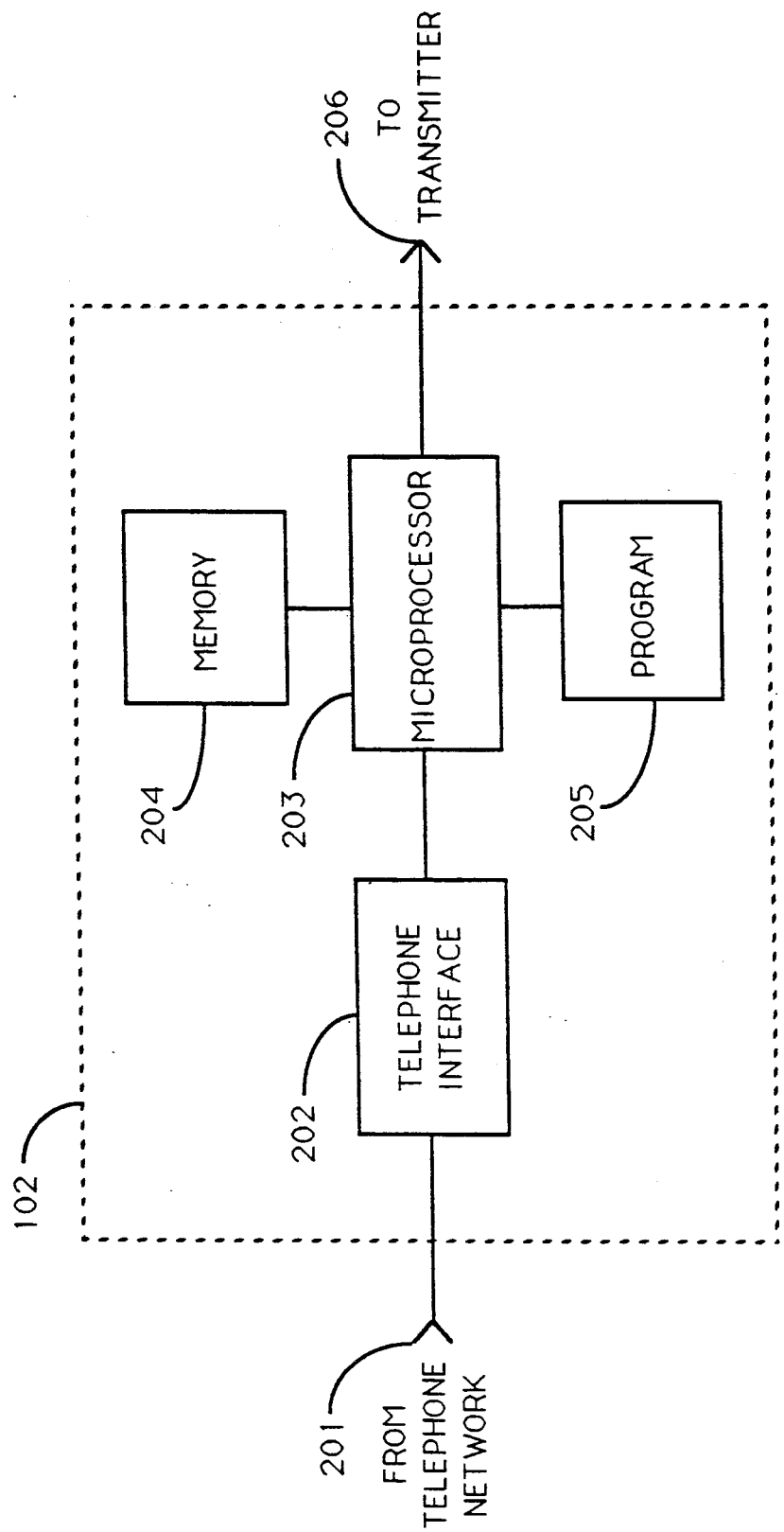
FIG. 2 is a block diagram of the paging terminal of FIG. 1.

Referring to FIG. 2, the terminal 102 comprises an input 201 for receiving selective calls from the telephone network 101. The selective calls are forwarded to the telephone interface 202, and then to the microprocessor 203 for formatting. In a first embodiment of the invention, the program 205 can be downloaded with at least one source identifier for selected SCR's on the system. The source identifiers may comprise specific telephone numbers from which the SCR 112 might receive selective call messages. Each source identifier has a corresponding source label, which may comprise one or more alphanumeric digits. When the terminal 102 receives a selective call whose message portion comprises a telephone number or code which is resident within the terminal 102 as a stored source identifier, the source label corresponding to that stored source identifier is added by the terminal 102 and sent to the SCR 112 as part of the selective call. The SCR 112 has a data library contained within the memory 108 that comprises a cross-reference between source labels and associated information that may comprise "canned" alphanumeric messages. The data library may be downloaded into the pager over-the-air from the terminal 102 and the transmitter 103, or by a different means.

Typical "canned" alphanumeric messages that would be associated with certain source labels and source identifiers might comprise "WIFE", "BOSS", "SECRETARY", etc. There may also be a provision for generating a source label corresponding to the message "OTHER" when the source identifier is one that does not correspond to "WIFE", "BOSS", or "SECRETARY". The first embodiment of the invention, therefore, allows the SCR user to receive and display alpha source information with his messages even when the selective call entry device is limited to a telephone.

Alternately, the "canned" alphanumeric messages may originate from the terminal 102 rather than being generated by transmission of a source label to the selective call receiver 112. This would eliminate the need for a special SCR design.

As an additional alternative, source identifiers may comprise, rather than specific telephone numbers, a number indicating a generic class of source such as calls originating inside a telephone public branch exchange (PBX) as opposed to those coming from outside the PBX.

Figure 3:
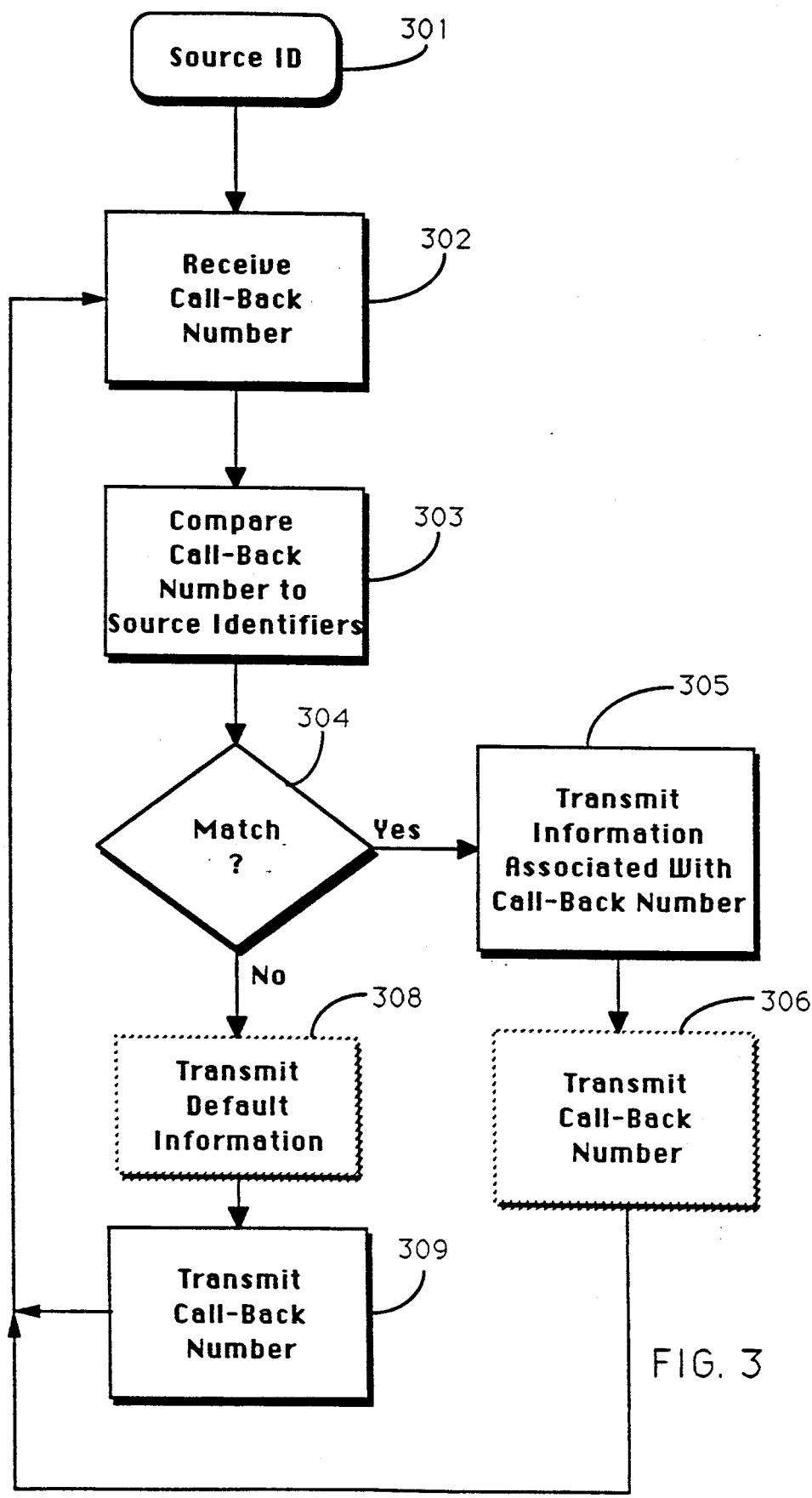
FIG. 3 is a flow diagram illustrating the steps performed by the paging terminal of FIG. 1 and FIG. 2 in accordance with a of the present invention.

Referring to FIG. 3, a flow diagram illustrating the steps performed by the paging terminal of FIGS. 1 and 2 in accordance with the first embodiment of the present invention comprises the programming of source identification into the memory 204 through the program 205 of the terminal 102, step 301. Next, a call-back number that may comprise a telephone number is received by the terminal 102, step 302, and the call-back number is compared to the source identifiers within the memory 204, step 303. If there is a match in step 304, the information associated with the callback number, typically comprising a source digit, is transmitted to the appropriate selective call receiver(s), step 305 and, optionally, the call-back number is also transmitted, step 306. The process then returns to step 302 to await the receipt of the next call-back number.

If, in step 304, there is no match between the call-back number and the source identifiers in the memory 204, default information is optionally transmitted, step 308, and the call-back number is transmitted, step 309. The process then returns to step 302. The default information may comprise a source digit that results in the display of the source message "OTHER" in the selective call receiver 112.

Referring again to FIG. 2, in a second embodiment of the invention, the telephone interface 202 portion of the terminal 102 comprises means for converting numeric data, entered by a person via a telephone, into a predetermined alphanumeric message. As in the case of the first embodiment, the selective call is initiated by the person entering the code corresponding to the SCR he wishes to address into the telephone. The person then receives a prompt to select either: (a) connection to an operator, (b) entry of a conventional numeric message, or (c) entry of a numerically-coded alphanumeric message. If the person chooses (a), he is connected to a human operator for assistance in entering his selective call. If (b) is chosen, a conventional numeric selective call message may be entered by the person through the telephone. If (c) is chosen, the person may enter a numeric message that corresponds to an alphanumeric message.

The telephone interface 202 comprises a data library which includes information associated with certain numeric codes. The information may comprise a set of stored alphanumeric messages that may be selectively recalled and sent as a selective call message by choosing the aforegoing choice (c) and entering the appropriate numeric code(s) for the desired message(s). Some alphanumeric messages are universally used and, therefore, may be preprogrammed into the telephone interface 202 or, alternatively, into a different section of the terminal 102. Since some paging system users might desire a provision for having common, system-specific messages available, certain numeric entries may be understood to correspond to alphanumeric messages. A handy reference for system users may comprise a numeric/alphanumeric cross-reference for both preprogrammed and system-specific messages, which may be available on a convenient credit card-type card.

For example, in a typical system utilizing the second embodiment, the numeric digits "1" and "2" may represent the preprogrammed messages "Meeting At" and "Called By", respectively. The numeric digits "11" may represent the system-specific message "Carol". If the alphanumeric message to be sent comprises "Meeting At 12:45 Called By Carol", the person entering the page through the telephone would refer to his reference card and enter \*1\*1245\*2\*11\*\*, where a single asterisk separates each entry and a double asterisk signifies the end of the message. The selective call message received by the selective call receiver would then appear as shown on the display: "Meeting At 1245 Called By 11". The selective call receiver user would refer to his reference card to determine that "11" represents "Carol". Alternatively, the selective call receiver could have the system-specific cross-reference programmed into the memory 108, in which case "Carol" would be displayed instead of "11" in the aforegoing example.

As an additional alternative, the telephone interface 202 could instruct the person entering the selective call through prerecorded voice prompts. The preprogrammed messages available in the telephone interface 202 could be presented to and received by the person through this alternative.

Figure 4A:
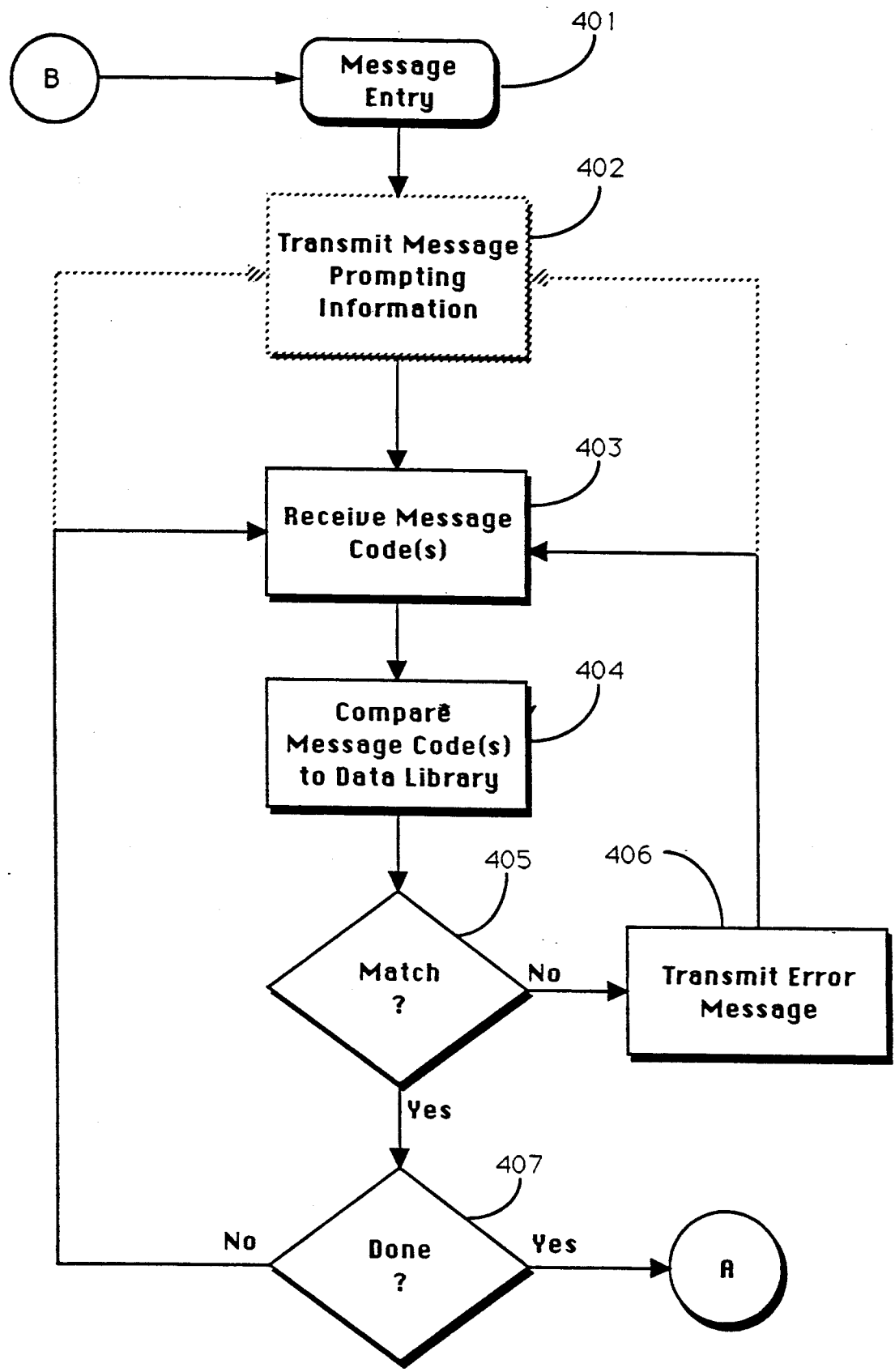
FIG. 4a and 4b are a flow illustrating the steps performed by the paging terminal of FIG. 1 and FIG. 2 in accordance with a second embodiment of the present invention.
Figure 4B:
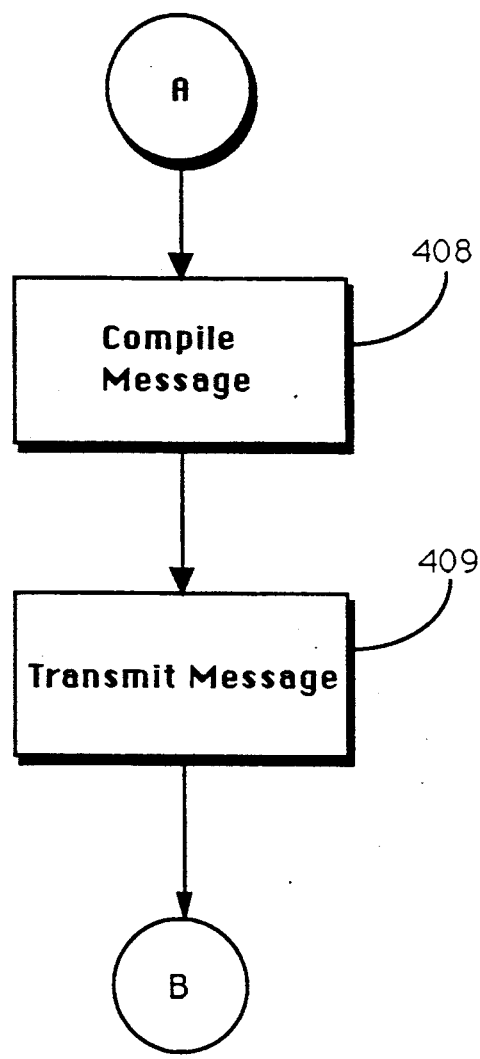

Referring to FIG. 4, a flow diagram illustrating the steps performed by the paging terminal of FIGS. 1 and 2 in accordance with a second embodiment of the present invention comprises entry of a selective call message into the telephone interface 202 from a telephone, step 401. Next, optionally, message prompting information is transmitted back to the person entering the selective call message, step 402. The message prompting information may be presented in the form of a prerecorded voice. Next, the message code(s) is (are) received by the telephone interface 202 from the person entering the selective call, step 403, and the received message code(s) is (are) compared to the data library contained within the telephone interface 202, step 404. If, in step 405, there is no match between the received message code(s) and the messages resident in the data library, an error message is transmitted, step 406, and the process returns to step 403, or optionally, to step 402. If a match is found in step 405 and if more message codes are awaiting decoding in step 407, the process returns to step 403, or, optionally, to step 402, to receive the next message code. If, in step 407, there are no more message codes to be received, all of the received and decoded messages are compiled, step 408, and the message(s) are transmitted over-the-air through the transmitter 103 and the antenna 104, step 409.

We claim:

1. A method for generating a selective cell message from a terminal to first and second selective cell receivers, comprising the steps of:
   (a) receiving by the terminal a signal comprising a received source identifier and a message, to provide a received signal;
   (b) comprising said received source identifier with stored source identifiers within said terminal to determine first and second transmitted source labels; and
   (c) transmitting said message and said first transmitted source label to said first selective cell receiver, and said message and said second transmitted source label to said second selective cell receiver.

2. A terminal for generating a selective cell message to first and second selective cell receivers, comprising:
   (a) means for receiving a signal comprising a received source identifier and a message to provide a received signal;
   (b) means for comparing said received source identifier with stored source identifiers within said terminal to determine first and second transmitted source labels; and
   (c) means for transmitting said message and said first transmitted source label to said first selective cell receiver, and said message and said second transmitted source label to said second selective cell receiver.

\* \* \* \* \*

UNITED STATES PATENT AND TRADEMARK OFFICE
CERTIFICATE OF CORRECTION

PATENT NO. : 5,066,949

DATED : November 19, 1991

INVENTOR(S) : Robert L. Breeden

It is certified that error appears in the above-identified patent and that said Letters Patent is hereby corrected as shown below:

On the Title page
item [75] Inventors:

After "Robert L. Breeden", insert --Boynton Beach, Fla.-- and delete "Richard E. Johnson, both of Boynton Beach; Amy R. Kabcenell, Highland Beach; Thomas F. Holmes, Boynton Beach, all of Fla."

Signed and Sealed this

Twenty-third Day of February, 1993

*Attest:*

STEPHEN G. KUNIN

*Attesting Officer*       *Acting Commissioner of Patents and Trademarks*